F. X. FRANK.
SUCTION DUST REMOVER.
APPLICATION FILED JUNE 24, 1909.
951,808.
Patented Mar. 15, 1910.
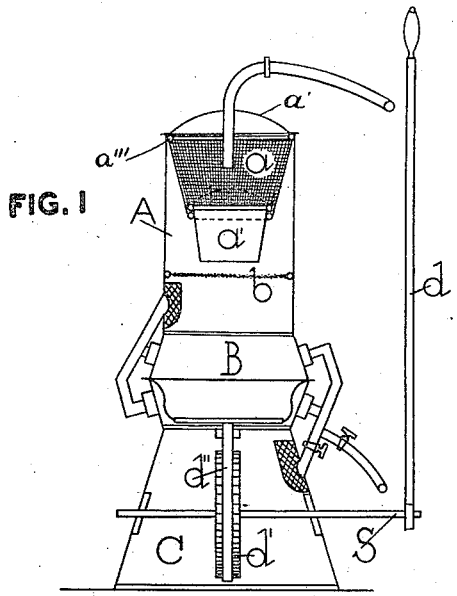
FIG. I
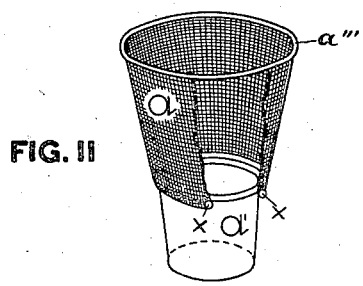
FIG. II
Witnesses:
Samuel Terrell
A H Barlow
Frank Xavier Frank
Inventor.

UNITED STATES PATENT OFFICE.

FRANK XAVIER FRANK, OF GUELPH, ONTARIO, CANADA.

SUCTION DUST-REMOVER.

951,808.  Specification of Letters Patent. Patented Mar. 15, 1910.

Application filed June 24, 1909. Serial No. 504,192.

*To all whom it may concern:*

Be it known that I, FRANK XAVIER FRANK, a subject of His Majesty King Edward VII of Great Britain, residing at the city of Guelph, in the county of Wellington and Province of Ontario, Dominion of Canada, have invented a certain new and useful Improvement in Suction Dust-Removers, of which the following is a specification.

My invention relates to improvements in suction dust removers in which the dust laden air is sucked up by means of a piston air pump and is precipitated into a bucket shaped receptacle with a solid bottom and sides of screening material. I attain these objects by the mechanism illustrated in the accompanying drawings, in which:—

Figure I. is a sectional elevation of a suction dust remover containing my improvement, and Fig. II. is a perspective view of my improved dust receptacle.

Similar letters of reference indicate similar parts in all the drawings.

In previous dust removing machines it has been a difficult matter to take the accumulated dust and dirt out of the machine, in some cases the entire machine has to be inverted and in others the entire dust settling chamber has to be almost taken to pieces to clean out the dust and dirt.

In Fig. I. A is the dust collecting or screen chamber, B is the air pump with its inlet and outlet valves, and C is the operating chamber into which the effluent cleansed air is usually discharged.

The dust collecting chamber A usually contains the bucket shaped screen $a$ and the flat screen $b$; the bucket shaped screen is of screening material, with a solid bottom—my improvement consists in removing the solid bottom, replacing it with a hoop or ring $x$ Fig. II. and inserting therein a supplementary bucket, pail or receptacle $a'$ with a bail or handle $a''$ as shown in Fig. I. This bucket or pail $a'$ is provided with an outwardly projecting rim $a'''$ at the top in the usual manner, and sits easily in the bottom of the bucket shaped screen $a$.

As will readily be seen the dust and heavier particles of dirt settle naturally into the pail or bucket $a'$ composing the bottom of the bucket shaped screen, which can be easily lifted out by means of the bail or handle, and then replaced in a similar manner.

I am aware that the bucket shaped screen itself has been used before but not my improved extension thereof.

I claim—

The improvement in suction dust removers with bucket shaped screens, comprising in combination therewith an internal ring or hoop ($x$) secured to the bottom of the said screen, and a pail ($a'$) with a wire rim and a solid bottom, said pail being inserted from the top of the bucket shaped screen and supported by the wire rim resting on the ring or hoop ($x$) at the bottom of the flaring sides of the bucket shaped screen, substantially as hereinbefore described and illustrated in the drawings.

FRANK XAVIER FRANK.

Witnesses:
SAMUEL TERRELL,
D. H. BARLOW.